United States Patent
Ogasawara et al.

(10) Patent No.: US 7,574,627 B2
(45) Date of Patent: Aug. 11, 2009

(54) MEMORY DUMP METHOD, MEMORY DUMP PROGRAM AND COMPUTER SYSTEM

(75) Inventors: Katsuhisa Ogasawara, Yokohama (JP); Yumiko Sugita, Sagamihara (JP); Hirofumi Nagasuka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 460 days.

(21) Appl. No.: 11/647,600

(22) Filed: Dec. 29, 2006

(65) Prior Publication Data

US 2007/0220350 A1    Sep. 20, 2007

(30) Foreign Application Priority Data

Feb. 22, 2006    (JP) .............. 2006-045394

(51) Int. Cl.
*G06F 11/00* (2006.01)
(52) U.S. Cl. ....................................... 714/38
(58) Field of Classification Search ........... None
See application file for complete search history.

(56) References Cited

U.S. PATENT DOCUMENTS

| | | | | |
|---|---|---|---|---|
| 6,845,470 | B2* | 1/2005 | Austen et al. ............ | 714/38 |
| 6,892,383 | B1 | 5/2005 | Arndt | |
| 7,490,203 | B2* | 2/2009 | Hsu et al. ............... | 711/147 |
| 2003/0204780 | A1* | 10/2003 | Dawkins et al. ........ | 714/24 |
| 2008/0115012 | A1* | 5/2008 | Jann et al. .............. | 714/38 |

FOREIGN PATENT DOCUMENTS

JP    2005-122334 A    5/2005

* cited by examiner

*Primary Examiner*—Michael C Maskulinski
(74) *Attorney, Agent, or Firm*—McDermott Will & Emery LLP

(57) ABSTRACT

A technique for identifying a fundamental cause of a system fault in a system in which a plurality of OSs run on one computer. In a system in which each of a plurality of operating systems executes a process by time-sharing hardware of one computer, a plurality of related OSs are stored in advance in association with each other, in a storage means. When a fault is detected in an OS and the storage means stores an OS associated with the OS in which the fault has occurred, a memory dump is performed for the OS in which the fault has occurred and the OS associated with that OS.

6 Claims, 9 Drawing Sheets

| | |
|---|---|
| VIRTUAL COMPUTER a MEMORY AREA | 301 |
| VIRTUAL COMPUTER b MEMORY AREA | 302 |
| VIRTUAL COMPUTER c MEMORY AREA | 303 |
| VIRTUAL COMPUTER MONITOR MEMORY AREA | 304 |

| 311 | 312 | 313 | |
|---|---|---|---|
| VIRTUAL COMPUTER | VIRTUAL PAGE ADDRESS | ACTUAL PAGE ADDRESS | ... |
| VIRTUAL COMPUTER a | aaa | AAA | ... |
| | aaaaaa | AAAAAA | ... |
| | ... | ... | ... |
| VIRTUAL COMPUTER b | bbb | BBB | ... |
| | bbbbbb | BBBBBB | ... |
| | ... | ... | ... |
| VIRTUAL COMPUTER c | ccc | CCC | ... |
| | cccccc | CCCCCC | ... |
| | ... | ... | ... |
| ... | ... | ... | ... |

| VIRTUAL COMPUTER | VIRTUAL CPU | SAVE REGISTER | ... |
|---|---|---|---|
| VIRTUAL COMPUTER a | CPUaa | ××× | ... |
|  | CPUab | ××× | ... |
|  | ... | ... | ... |
| VIRTUAL COMPUTER b | CPUba | ××× | ... |
|  | CPUbb | ××× | ... |
|  | ... | ... | ... |
| VIRTUAL COMPUTER c | CPUca | ××× | ... |
|  | CPUcb | ××× | ... |
|  | ... | ... | ... |
| ... | ... | ... | ... |

401 — VIRTUAL COMPUTER
402 — VIRTUAL CPU
403 — SAVE REGISTER

| ACTIVE OS | RELATED OS | ... |
|---|---|---|
| OSa | OSb | ... |
|  | OSc | ... |
| OSb | OSa | ... |
| OSc | OSa | ... |
| ... | ... | ... |

501 — ACTIVE OS
502 — RELATED OS

| 601 / 602 DUMP EXECUTION OS / FAULTY OS | OSa | OSb | OSc | 603 AUTOMATIC SETTING FLAG |
|---|---|---|---|---|
| OSa | Yes | Yes | Yes | ON |
| OSb | Yes | Yes | No | ON |
| OSc | No | No | No | OFF |

| 701 DUMP EXECUTION OS DESIGNATION | 702 VALIDITY FLAG | ... |
|---|---|---|
| DUMP EXECUTION OS TABLE | Yes | ... |
| MANUAL DESIGNATION | Yes | ... |
| ... | ... | ... |

MEMORY DUMP METHOD, MEMORY DUMP PROGRAM AND COMPUTER SYSTEM

BACKGROUND OF THE INVENTION

The present invention relates to execution of memory dump.

In an ordinary computer system, an Operating System (OS) controls hardware such as, for example, an instruction execution unit (a Central Processing Unit (CPU), a Micro Processing Unit (MPU), or the like), main storage (hereinafter, referred to as a memory), secondary storage, input-output units, a file device, a communication unit, and the like, and for controlling a schedule for using hardware. Further, the OS provides a software interface for a user to use the computer easily. For example, an application program such as a spread sheet program or a word processing program uses the computer hardware through the control of OS.

Sometimes, the OS hangs-up or malfunctions owing to a fault caused by hardware failure or program trouble (which may be OS itself). However, where a high degree of reliability and availability of a computer system are required, as in a computer system used as a backbone system for example, faults that may cause a hang-up or malfunction need to be avoided or quickly resolved.

As a technique for meeting the above demand, a memory dump may be performed when a fault in a computer system makes it difficult to continue running the OS. Here, "memory dump" means that information stored in an instruction execution unit, a memory, and the like, of the computer system at the time of occurrence of the fault in the computer system is saved as fault information, in secondary storage. An administrator or the like analyzes the contents of the memory dump to specify and correct the cause of the fault and to restart the computer system.

On the other hand, there are cases where a plurality of OSs runs on one computer system. Technologies for running a plurality of OSs on one computer system, includes a virtual computer system, Logical Partitioning (LPAR), and the like, for example. In these technologies, an instruction execution unit is time-shared to perform processes of a plurality of OSs in parallel so that the processes of the plurality of OSs is performed on one computer.

Patent Document 1 describes a technique of performing a memory dump with respect to a faulty OS when a fault occurs in a system that performs processes of a plurality of OSs on one computer. According to the technique described in the above document, information in a data area used by a hypervisor (i.e. software for providing a logical partitioning function of a computer in system partitioning) is acquired. The information acquired at the time of occurrence of fault is used for analyzing the fault.

Further, Patent Document 2 describes a technique in which, when a fault occurs in an OS on a virtual computer, a memory dump of the faulty OS is performed using, for example, another OS having a dump function, and the memory dump is stored in a form that can be analyzed by a system administrator or a debugger, in secondary storage.

Patent Document 1: U.S. Pat. No. 6,892,383
Patent Document 2: Japanese Non-examined Patent Laid-Open No. 2005-122334

The techniques disclosed in Patent Documents 1 and 2 perform a memory dump of only an OS in which a fault occurs. However, in the case of a system that provides a shared file system or a cluster system for a plurality of OSs, a fundamental cause of system fault does not necessarily lie in the OS in which the fault occurs.

The present invention has been made considering the above-described situation, and an object of the invention is to provide a technique that can specify a fundamental cause of a system fault in a computer system performing processes of a plurality of OSs.

SUMMARY OF THE INVENTION

The present invention has been made to achieve the above object. According to the present invention, in a computer system in which respective processing processes of a plurality of operating systems are performed in parallel, a plurality of OSs that operate in cooperation with each other are stored in advance, in association with each other in a storage means; and when an occurrence of fault in an operating system is detected, OSs associated with the OS in which the fault has occurred are read from the storage means, and a memory dump is performed for the OS in which the fault has occurred and the read OSs.

Further, the present invention provides a memory dump method by a computer system that performs respective processing processes of a plurality of operating systems in parallel, wherein: the computer system comprises: a dump execution OS storage means, which stores two or more operating systems that operate in cooperation, associating the operating systems with each other, out of the plurality of operating systems; a first storage means, which stores data used for performing a processing process of each of the plurality of operating systems; and a second storage means; and the memory dump method performed by the computer system comprises; a detection step, in which fault occurring in an operating system is detected; a halt step, in which when the fault is detected, operating systems associated with the operating system (hereinafter, referred to as the faulty OS) in which the fault has occurred are read from the dump execution OS storage means, and a processing process of the faulty OS and processing processes of the read operating systems (hereinafter, referred to as the dump execution OSs) are halted; a data acquisition step, in which data for performing the processing process of the faulty OS and data for performing the processing processes of the dump execution OSs are read from the first storage means, and the read data are stored to the second storage means; and an output step, in which the data are read from the second storage means and outputted.

According to the present invention, memory dump can be performed not only for an OS in which a fault has occurred but also with respect to other OSs, and thus it is possible to specify a fundamental cause of the system fault.

BRIEF DESCRIPTION OF THE DRAWINGS

FIG. 3 is a diagram showing an example of a memory management table in the same embodiment;

FIG. 4 is a diagram showing an example of a CPU register table in the same embodiment;

FIG. 5 is a diagram showing an example of a related OS table in the same embodiment;

FIG. 6 is a diagram showing an example of a dump execution OS table in the same embodiment;

FIG. 7 is a diagram showing an example of a dump execution policy table in the same embodiment;

DETAILED DESCRIPTION

Figure 1:
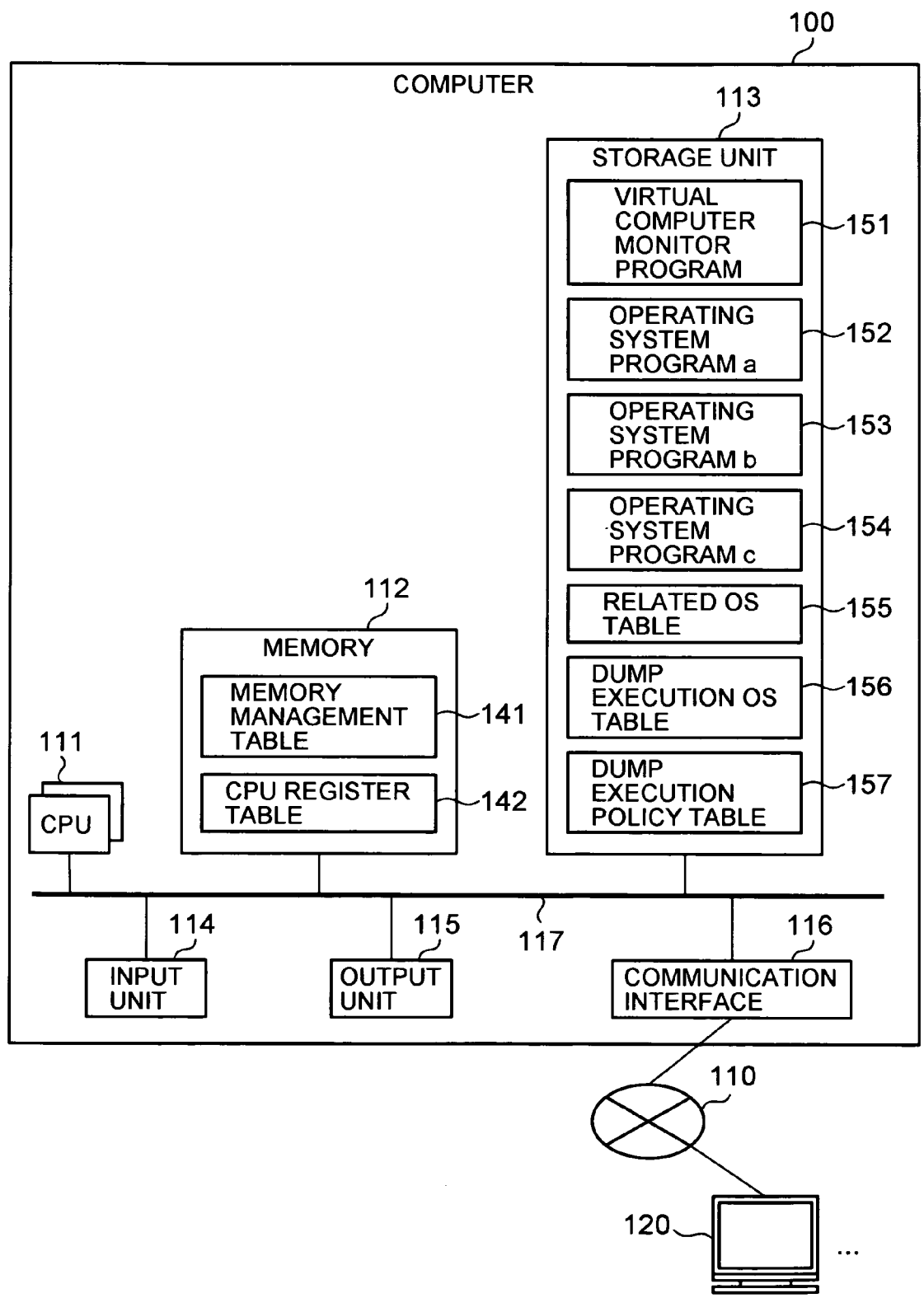
FIG. 1 is a diagram showing an example of a hardware configuration of a computer according to one embodiment of the present invention.

An embodiment of the present invention will now be described in detail referring to the drawings.

First Embodiment

As a first embodiment, an example will be described where a dump execution system of the embodiment is applied to a virtual computer system.

FIG. 1 is a diagram showing an example of a hardware configuration of a computer system of the first embodiment.

As shown in FIG. 1, a computer system comprises a computer 100, a communication network 110, an information processing apparatus 120, and the like. The computer 100 and the information processing apparatus 120 are connected through the network 110.

The example of FIG. 1 shows one computer 100, one communication network 110 and one information processing apparatus 120. However, there is no limitation to there being one of each of these, and there may be any number of apparatuses.

The computer 100 and the information processing apparatus 120 are each an information processing apparatus such as a server, for example. The communication network 110 is, for example, a Local Area Network (LAN), a Wide Area Network (WAN), a public network, a dedicated line, Internet, or the like.

The computer 100 comprises a CPU 111, a memory 112, a storage unit 113, an input unit 114 an output unit 115, a communication interface 116, and the like. The CPU 111, the memory 112, the storage unit 113, the input unit 114, the output unit 115, the communication interface 116, and the like are connected through a bus 117 or the like.

The respective numbers of items of the CPU 111, the memory 112, the storage unit 113, the input unit 114, the output unit 115, the communication interface 116, and the like are not limited to those shown in FIG. 1. An arbitrary number of these component units may be used.

The memory 112 holds a memory management table 141, a CPU register table 142, and the like. Details of each table will be described later.

The storage unit 113 is, for example, a storage medium such as a Compact Disc-Recordable (CD-R), a Digital Versatile Disk-Random Access Memory (DVD-RAM), or the like and a drive unit for such a storage medium, or a Hard Disk Drive (HDD). The storage unit 113 holds a virtual computer monitor program 151, an operating system program a 152, an operating system program b 153, an operating system program c 154, a related OS table 155, a dump execution OS table 156, a dump execution policy table 157, and the like. Details of these programs and tables will be described later.

The input unit 114 is, for example, a keyboard, a mouse, a microphone, or the like. The output unit 115 is, for example, a display, a printer, a speaker, or the like. The computer 100 is connected to the communication network 110 through the communication interface 116.

The information processing apparatus 120 is an ordinary information processing apparatus comprising a CPU, a memory, a storage unit, an input unit, an output unit, a communication interface, and the like, similar to the above-described computer 100. Accordingly, a detailed description of the information processing apparatus 120 is omitted here.

Next, an example of a functional configuration of the computer 100 will be described referring to FIG. 2.

When the CPU 111 of the computer 100 reads the virtual computer monitor program 151 from the storage unit 113, loads the program 151 into the memory 112, and executes the program 151, a Virtual Machine Monitor (VMM) 201, a virtual computer a 202, a virtual computer b 203, a virtual computer c 204, and the like, are realized. The virtual computer a 202 realizes a virtual CPU 221, a virtual memory 222, and the like. The virtual CPU 221 is realized by time-sharing the CPU 111 through the below-described function of VMM 201. Further, the virtual memory 222 is realized by using a prescribed area of the memory 112 through the below-described function of the VMM 201. The virtual CPU 221 executes the operating system program a 152 loaded into the virtual memory 222, to realize functions of an OS a 223. The virtual computer b 203 realizes a virtual CPU 231, a virtual memory 232, and the like. The virtual CPU 231 is realized by time-sharing the CPU 111 through the below-described function of the VMM 201. Further, the virtual memory 232 is realized by using a prescribed area of the memory 112 through the below-described function of the VMM 201. The virtual CPU 231 executes the operating system program b 153 loaded into the virtual memory 232, to realize functions of an OS b 233. The virtual computer c 204 realizes a virtual CPU 241, a virtual memory 242 and the like. The virtual CPU 241 is realized by time-sharing the CPU 111 through the below-described function of the VMM 201. Further, the virtual memory 242 is realized by using a prescribed area of the memory 112 through the below-described function of the VMM 201. The virtual CPU 241 executes the operating system program c 154 loaded into the virtual memory 242, to realize functions of an OS c 243.

Any application program may be executed independently on each OS a, b, or c 223, 233, or 243. Further, a shared file system or a cluster system may be constructed among the OSs a, b, and c 223, 233, and 243.

The VMM 201 comprises a virtual computer control unit 211, a change unit 212, a fault detection unit 213, and a dump execution unit 214. The virtual computer control unit 211 has a function of realizing a conventional virtual computer. In other words, for example, the virtual computer control unit 211 allocates the CPU 111 in a time sharing way to the virtual computer a 202, the virtual computer b 203 and the virtual computer c 204, to perform respective processes of the OSs 223, 233 and 243 in parallel. Further, the virtual computer control unit 211 allocates areas of the memory 112 to the virtual computer a 202, the virtual computer b 203, and the virtual computer c 204, respectively. The virtual computer control unit 211 reserves I/O resources of external devices used by the OSs a, b, and c 223, 233, and 243. The change unit 212 updates the dump execution OS table 156 when the related OS table 155 is updated. Further, the change unit 212 sets and updates information included in the related OS table 155, the dump execution OS table 156, the dump execution policy table 157, and the like, according to information inputted through the input unit 114 or the communication interface 116. Further, the change unit 212 receives a memory dump execution instruction, which is inputted through the input unit 114 or the communication interface 116. The fault detection unit 213 detects a fault that has occurred on the OS 223, 233 or 243, saves the registers of the CPU 111 and pauses time sharing allocation of the CPU 111 to the virtual computer a 202, the virtual computer b 203, the virtual computer c 204, and the like. The dump execution unit 214 saves the memory contents of an OS as an object of memory dump (hereinafter, referred to as a dump execution OS).

Figure 2:
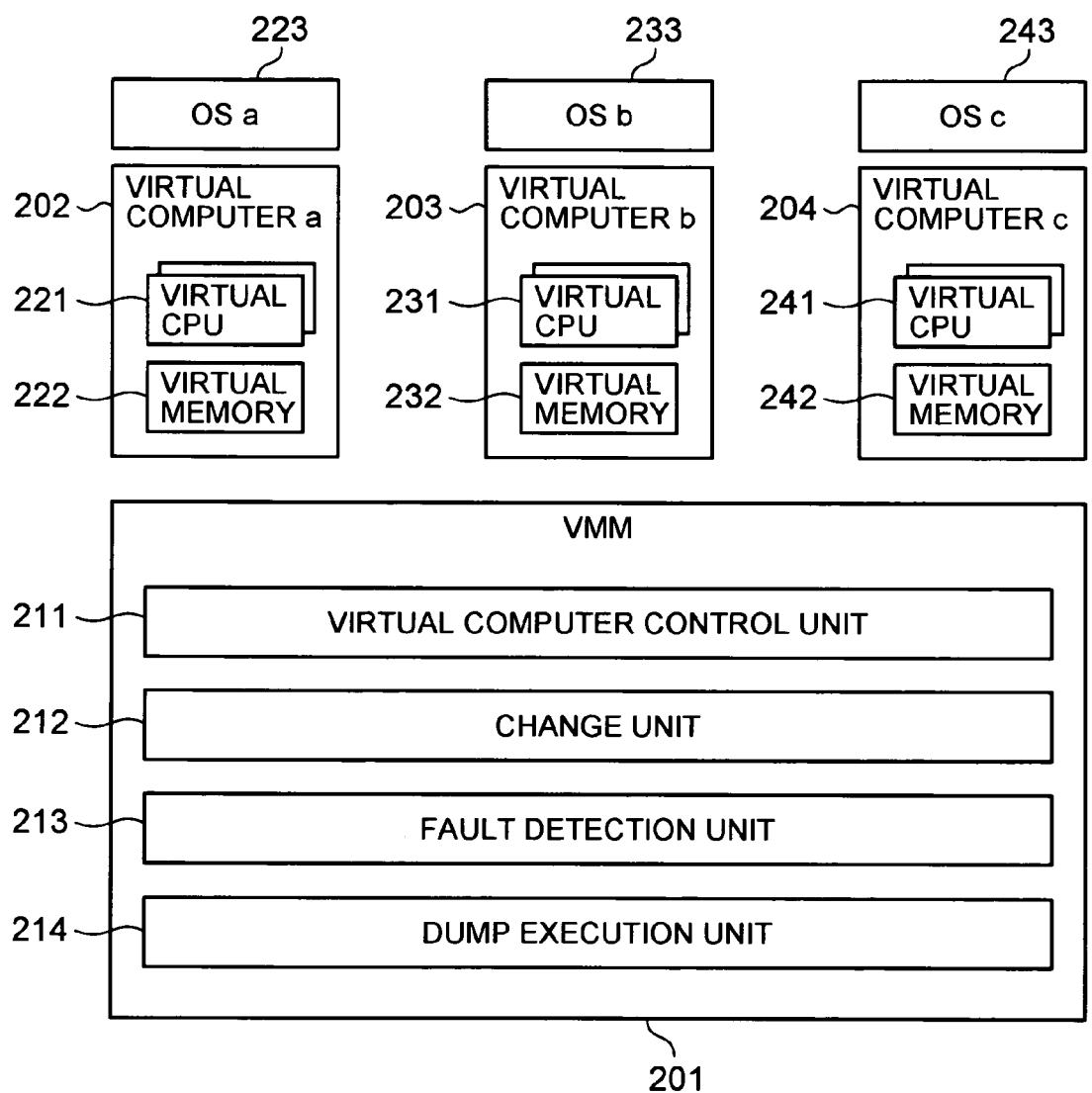
FIG. 2 is a diagram showing an example of a functional configuration of the computer in the same embodiment.

The example of FIGS. 1 and 2 is shown assuming that the number of operating systems executed in the virtual computers and the computer 100 is three. However, the number is not limited to three, and any number of operating systems may be executed. Further, it is shown that each virtual computer has two virtual CPUs. However, the number of virtual CPUs is arbitrary without being limited to two.

Next, each table will be described referring to the related drawing.

First, an example of the memory management table 141 will be described referring to FIG. 3. The memory management table 141 is similar to one used in conventional virtual computer technology.

FIG. 3A shows an example of areas of the memory 112 allocated respectively to the virtual computer a 202, the virtual computer b 203 and the virtual computer c 204.

The memory 112 has a memory area 301, a memory area 302, and a memory area 303, as areas used by the virtual computer a 202, the virtual computer b 203, and the virtual computer c 204, respectively. The memory area 301 is an area used by the virtual computer a 202. The memory area 302 is an area used by the virtual computer b 203. The memory area 303 is an area used by the virtual computer c 204. The virtual computer control unit 211 allocates these memory areas 301, 302, and 303 to the virtual computers a, b, and c 202, 203 and 204, respectively. This processing is conventional technology. Further, the memory 112 has a memory area 304 used by the VMM 201.

In this embodiment, a memory address of the memory 112 is expressed by an actual page address and a virtual page address. Here, an actual page address is an address corresponding to the real memory 112, and managed by dividing the whole memory 112 into areas each having a fixed size that is determined by the CPU architecture. A virtual page address is a virtual address that is made to look like a physical address for an OS a, b, or c 223, 233, or 243, by the corresponding virtual computer a, b or c 202, 203, or 204.

FIG. 3B shows an example of the memory management table 141. In FIG. 3B, the memory management table 141 includes a virtual computer 311, a virtual page address 312, an actual page address 313, and the like. A virtual computer 311, a virtual page address 312, an actual page address 313, and the like, are associated with each other. A virtual computer 311 indicates a virtual computer controlled by the virtual computer control unit 211. A virtual page address 312 is a virtual address that is made to look like a physical address for the OS executed by the corresponding virtual computer 311. An actual page address 313 is a real address in the memory 112 corresponding to the associated virtual page address 312.

The memory management table 141 is generated on the memory 112 by the virtual computer control unit 211 at the time of activating the virtual computers a, b, and c 202, 203, and 204. Operation of the virtual computer control unit 211 for generating the memory management table 141 is same as the operation in the conventional technology, and its description is omitted here. Usually, a virtual page address 312, which virtually looks like a physical address for an OS a, b, or c 223, 233, or 243, starts at 0 as its start address. Further, as a terminal address, is assigned an address that is the start address plus a memory size used by the OS. As an actual page address 313 corresponding to a virtual page address 312, the memory management table 141 stores an address of the virtual page address 312 in the real memory 112. As shown in FIG. 3A, a block of consecutive addresses may be allocated to each of the virtual computers a, b, and c 202, 203, and 204, or, a physical memory may be allocated in pages.

The memory management table 141 exemplified in FIG. 3 includes virtual page addresses and actual page addresses of all the virtual computers. However, the memory management table 141 is not limited to this. For example, it is possible that one table includes virtual page addresses and actual page addresses for only one virtual computer, and the number of the management tables 141 is the same number as that of the virtual computers.

Next, an example of the CPU register table 142 will be described referring to FIG. 4. The CPU register table 142 is the same as one in the conventional virtual computer technology.

FIG. 4 shows an example of a configuration of the CPU register table 142. The CPU register table 142 includes a virtual computer 401, a virtual CPU 402, a save register 403, and the like. A virtual computer 401, a virtual CPU 402, a save register 403, and the like are associated with each other. A virtual computer 401 indicates a virtual computer controlled by the virtual computer control unit 211. A virtual CPU 402 is a virtual CPU that is made to look like a physical CPU for the OS executed by the corresponding virtual computer 401. The save register 403 is data read from registers (not shown) of the CPU 111, namely, data that are used by the associated virtual computer 401 for its processing and saved by the virtual computer control unit 211, when the virtual computer control unit 211 allocates the CPU 111 to a virtual computer other than the associated virtual computer 401 in question, in a time sharing operation. Hereinafter, data stored in the registers of the CPU 111 will be referred to as register information also. For example, where the virtual computer control unit 211 allocates the CPU 111 to the virtual computer a 202, and then to the virtual computer b 203 after the virtual computer a 202 has performed processing by the virtual CPU "CPUaa", then the register information that has been used by the virtual computer a 202 is stored in the save register 403 associated with the virtual computer 401 "virtual computer a" and the virtual CPU 402 "CPUaa" in the CPU register table 142 exemplified in FIG. 4. In cases where, after the allocation of the CPU 111 to the virtual computer b 203, the CPU 111 is allocated again to the virtual computer a 202 and the virtual computer a 202 is to perform its processing by the virtual CPU "CPUaa", then the virtual computer control unit 211 reads the data stored in the save register 403 associated with the virtual computer 401 "virtual computer a" and the virtual CPU 402 "CPUaa", and makes the virtual computer a 202 resume its processing.

The virtual computer control unit 211 generates a CPU register table 142 in the memory 112 when the virtual computer control unit 211 activates the virtual computers a, b, and c, 202, 203, and 204. Operation of the virtual computer control unit 211 for generating the CPU register table 142 is the same as the operation in the conventional technology, and its description is omitted here.

For the CPU register table 142 exemplified in FIG. 4, one table includes the virtual CPUs and the save registers for all the virtual computers. However, the CPU register table 142 is not limited to this. For example, it is possible that one table includes a virtual CPU and a save register for only one virtual computer, and a CPU register table 142 is prepared for each virtual computer.

An example of the related OS table 155 will be described referring to FIG. 5.

In FIG. 5, the related OS table 155 includes an active OS 501, a related OS 502, and the like. An active OS 501, a related OS 502, and the like, are associated with each other. An active OS 501 indicates an operating system executed on the computer 100. A related OS 502 indicates an operating system that provides service in cooperation with the associated active OS 501.

Here, it is assumed that information in the related OS table 155 has been set previously. However, information in the related OS table 155 may be set, deleted, or changed in accordance with information inputted through the input unit 114 or the communication interface 116. Furthermore, after the virtual computer control unit 211 activates the OSs, 223, 233, and 243, the virtual computer control unit 211 may automatically change information in the related OS table 155 through setting files (not shown) on the OSs a, b, and c 223, 233, and 243.

An example of the dump execution OS table 156 will be described referring to FIG. 6.

In FIG. 6, the dump execution OS table 156 includes faulty OSs 601 on the vertical axis, and dump execution OSs 602, an automatic setting flag 603, and the like, on the horizontal axis. A faulty OS 601 is associated with an automatic setting flag 603. The faulty OSs 601 and the dump execution OSs 602 are operating systems executed independently by respective virtual computers realized by the computer 100. A matrix part 604 defined by the faulty OSs 601 and the dump execution OSs 602 indicates whether memory dump of an operating system indicated by a dump execution OS 602 is performed or not when a fault occurs in an operating system indicated by a faulty OS 601. In the example shown in FIG. 6, "Yes" in the matrix part 604 indicates that memory dump of the operating system indicated by the dump execution OS 602 concerned is performed. Further, "No" in the matrix part 604 indicates that a memory dump of the operating system indicated by the dump execution OS 602 concerned is not performed. An automatic setting flag 603 indicates whether the matrix part 604 defined by the faulty OS 601 and the dump execution OSs 602, associated with the automatic setting flag 603, are automatically changed when the OSs related to the faulty OS 601 are changed. In the example shown in FIG. 6, an automatic setting flag 603 "ON" indicates that the matrix part 604 is changed automatically, while an automatic setting flag 603 "OFF" indicates that the matrix part 604 is not changed automatically.

Here, it is assumed that information in the dump execution OS table 156 has been set in advance. However, information in the dump execution OS table 156 may be set, deleted, or changed in accordance with information inputted through the input unit 114 or the communication interface 116. Further, in cases where an automatic setting flag 603 is "ON" in the dump execution OS table 156, the matrix part 604 is automatically generated or updated each time when the related OS table 155 is generated or updated. An example of this operation will be described later.

An example of the dump execution policy table 157 will be described referring to FIG. 7.

In FIG. 7, the dump execution policy table 157 includes a dump execution OS designation 701, a validity flag 702, and the like. A dump execution OS designation 701, a validity flag 702, and the like, are associated with each other. A dump execution OS designation 701 indicates a method of designating a dump execution OS. In the present embodiment, dump execution methods include a method of reading from the dump execution OS table 156 and a method of manual designation. A validity flag 702 indicates whether the method indicated by the corresponding dump execution OS designation 701 is valid or not. In the example shown in FIG. 7, a validity flag 702 "Yes" indicates that the method indicated by the corresponding dump execution OS designation 701 is valid, while a validity flag 702 "No" indicates that the method indicated by the corresponding dump execution OS designation 701 is invalid.

Here, it is assumed that information in the dump execution policy table 157 has been set in advance. However, information in the dump execution policy table 157 may be set, deleted, or changed in accordance with information inputted through the input unit 114 or the communication interface 116.

Next, operation examples will be described.

First, an example of operation for updating the dump execution OS table 156 will be described referring to FIG. 8.

Figure 8:
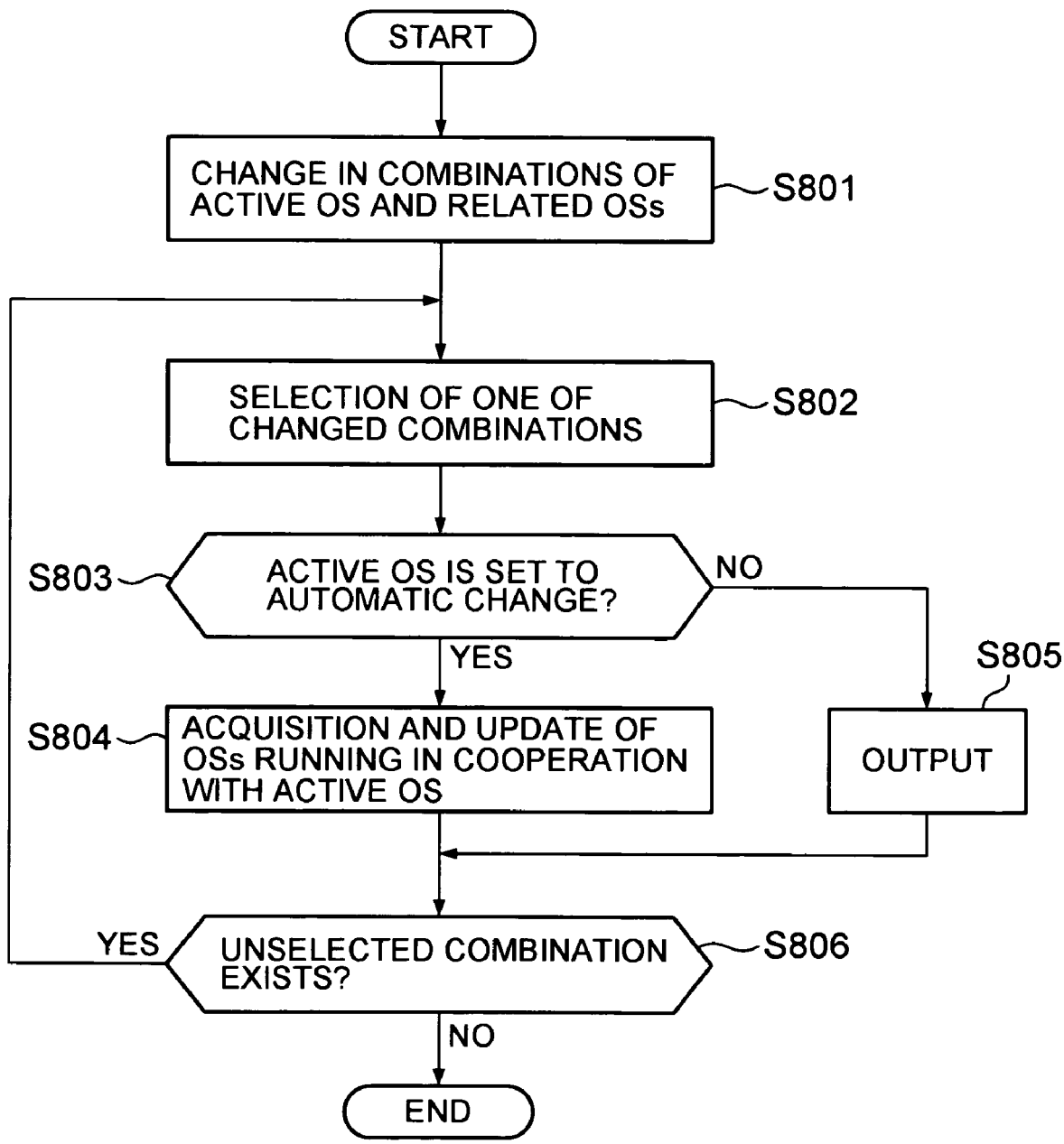
FIG. 8 is a flowchart showing an example of operation in changing the related OS table in the same embodiment.

In FIG. 8, when a combination or combinations of an active OS and an OS related to that active OS are changed (S801), the change unit 212 selects one of the changed combinations (S802). Examples of a change in a combination of an active OS and OSs related to that active OS include cases where the OS a, b, or c 223, 233, or 243 changes its setting file (not shown) or cases where information indicating setting, change, deletion, or the like, is inputted through the input unit 114 or the communication interface 116. In accordance with such information, the change unit 212 changes the related OS table 155. The change unit 212 selects one of the changed combinations of an active OS 501 and the associated related OSs 502 in the related OS table 155.

Next, with respect to the active OS in the combination selected in S802, the change unit 212 judges whether automatic change of the dump execution OS table is set (S803). To that end, the change unit 212 refers in the dump execution OS table 156 to the automatic setting flag 603 associated with a faulty OS 601 matching the active OS in the combination selected in S802, and judges whether the flag 603 is "ON" or not. When the automatic setting flag 603 is found to be "ON" as a result of the judgment, then the change unit 212 judges that automatic change of the dump execution OS table is set with respect to the active OS in the combination selected in S802.

When the judgment in S803 shows that automatic change of the dump execution OS table is set with respect to the active OS in the combination selected in S802, the change unit 212 acquires OSs operating in cooperation with the active OS in the combination selected in S802, and updates the matrix part 604 and the like of the dump execution OS table 156 (S804). To that end, for example, the change unit 212 reads related OS or OSs 502 associated with an active OS 501 matching the active OS selected in S802, from the related OS table 155. Next, in the matrix part 604 of the dump execution OS table 156, the change unit 212 changes an element defined by a faulty OS 601 matching the active OS in the combination selected in S802 and a dump execution OS 602 matching the active OS in the combination selected in S802 into "Yes". Further, in the matrix part 604 of the dump execution OS table 156, the change unit 212 changes an element defined by the faulty OS 601 matching the active OS in the combination selected in S802 and the dump execution OS 602 matching the read related OS into "Yes". In cases where a plurality of related OSs 502 associated with the active OS 501 matching the active OS in the combination selected in S802 have been read from the related OS table 155, the change unit 212 performs this processing for each related OS 502.

For example, a case will be described where, in the process of S802, a combination of the active OS "OSa" and the related OSs "OSb" and "OSc" is selected from the related OS table 155 exemplified in FIG. 5. In this case, referring to the dump execution OS table 156 exemplified in FIG. 6, it is found that the automatic setting flag 603 associated with the faulty OS 601 "OSa" is "ON". Accordingly, the change unit 212 judges that automatic change of the dump execution OS table is set. The change unit 212 reads the related OSs 502 "OSb" and "OSc" associated with the active OS 501 "OSa" from the dump execution OS table 156 exemplified in FIG. 6. Next, in the matrix part 604 of the dump execution OS table 156, the change unit 212 changes the element defined by the faulty OS 601 "OSa" and the dump execution OS 602 "OSa" into "Yes". Further, in the matrix part 604 of the dump execution OS table 156, the change unit 212 changes the element defined by the faulty OS 601 "OSa" and the dump execution OS 602 "OSb" into "Yes". Further, in the matrix part 604 of the dump execution OS table 156, the change unit 212 changes the element defined by the faulty OS 601 "OSa" and the dump execution OS 602 "OSc" into "Yes".

Figure 9:
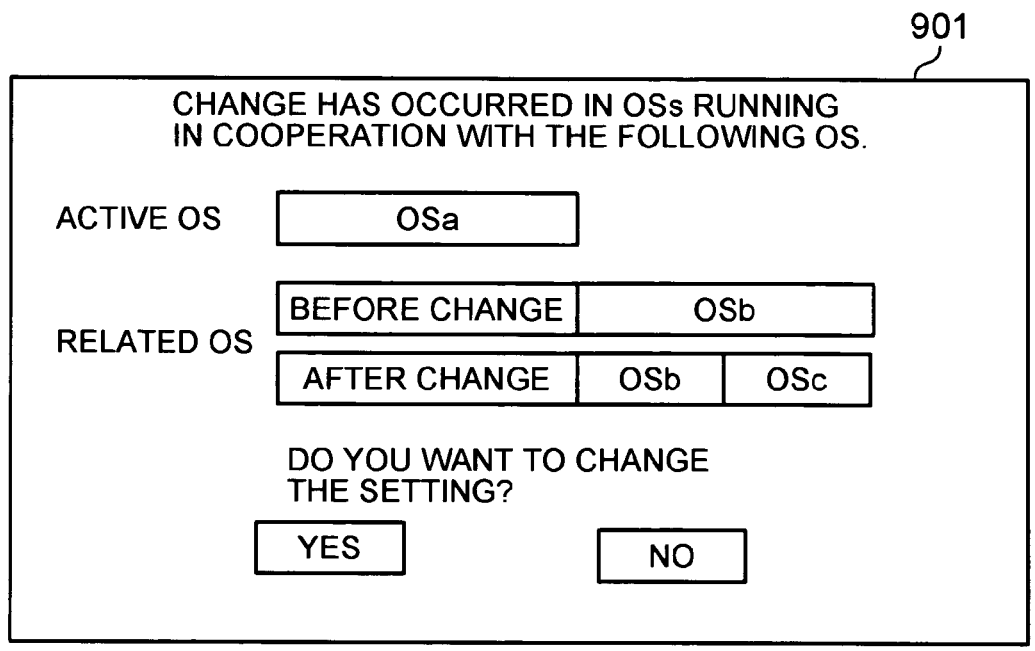
FIG. 9 is a view showing an example of screen in the same embodiment.

On the other hand, when the judgment in S803 shows that automatic change of the dump execution OS table is not set with respect to the active OS selected in S802, then the change unit 212 outputs information to give notice of the active OS and the fact that the combination of the active OS and the related OSs associated with that active OS has been changed, through the output unit 115 or the communication interface 116 (S805). FIG. 9 shows an example of a screen displayed, as a result of the above processing, on the output unit 115, such as a display, or on a display (not shown) or the like of the information processing apparatus 120. FIG. 9 shows an example of a screen 901 that is displayed by the change unit 212 using a prescribed format or the like. The change unit 212 generates data for the screen 901 by reading the active OS 501, the related OSs 502, and the like, associated with each other from the related OS table 155, and by synthesizing these OSs into the prescribed format. The change unit 212 outputs the generated data through the output unit 115, the communication interface 116, or the like. It is possible to arrange such that, when an administrator, using this screen 901 or the like, inputs an instruction of automatic change of the dump execution OS table through the input unit 114, the input unit of the information processing apparatus 120, or the like, then the change unit 212 changes the dump execution OS table 156 by the above-described operation of S804. Further, it is possible to arrange such that, when the administrator, using this screen 901 or the like, inputs an instruction of manual change of the dump execution OS table through the input unit 114, the input unit of the information processing apparatus 120, or the like, then the change unit 212 outputs screen data, or the like, for manual change using a prescribed format, for example. At that time, the change unit 212 may output screen data, or the like, for changing an automatic setting flag 603 in the dump execution OS table 156.

In cases where a new OS running on a virtual computer has been added to the computer 100, and the new OS has been added to the related OS table 155, the dump execution OS table 156 does not include a faulty OS 601 matching the active OS in the combination selected in S802. In such cases, the change unit 212 may automatically set the dump execution OS table by the same operation as described above. Further, similarly to the above operation, the change unit 212 may give a notice of addition of the new OS, and output a screen, or the like, for receiving an instruction on whether the dump execution OS table 156 is to be set automatically or the administrator himself is to set the dump execution OS table 156.

Next, an example of operation in cases in which a fault occurs will be described. Hereinafter, among the operating systems executed on the computer 100, an operating system in which fault has occurred is referred to as a faulty OS.

First, an example will be described of an operation performed when the fault detection unit 213 detects fault, referring to FIG. 10.

Figure 10:
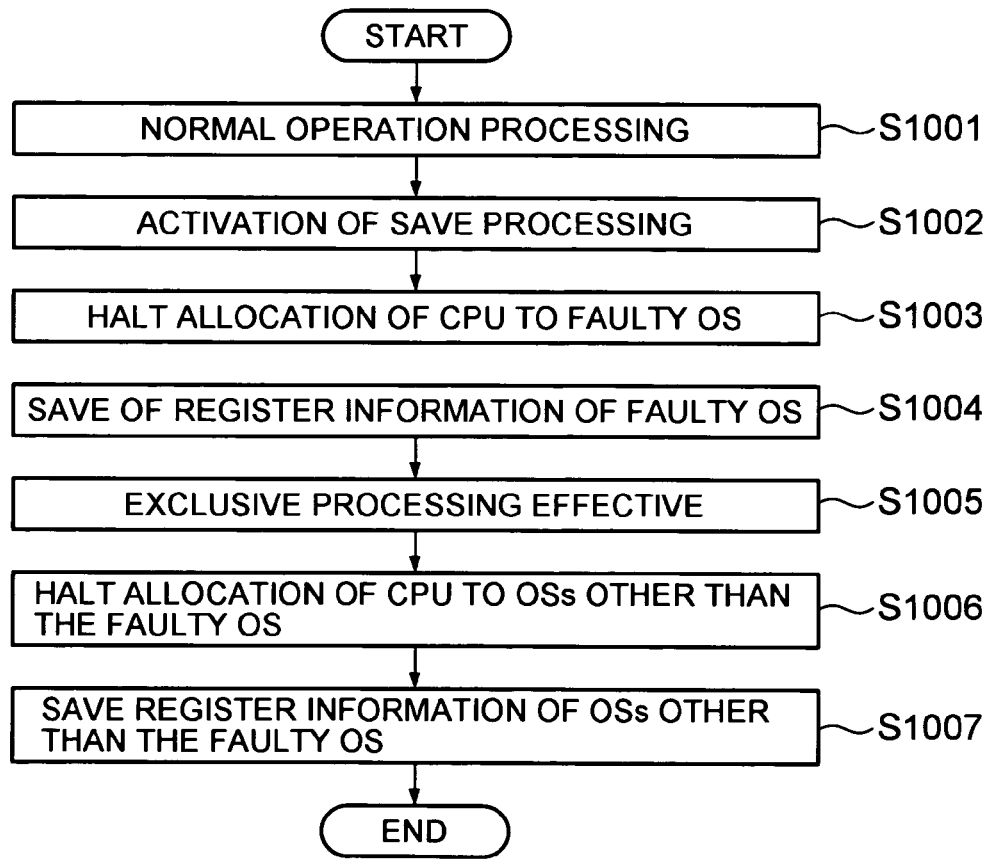
FIG. 10 is a flowchart showing an example of operation in cases where fault is detected in the same embodiment.

In FIG. 10, the virtual computer control unit 211 performs normal operation to control each of the virtual computers a, b and c 202, 203 and 204. The OSs 223, 23,3 and 243 executed on the respective virtual computers a, b and c 202, 203, and 204 perform normal operation processing (S1001). This operation is the same in the conventional virtual computer technologies.

When a prescribed event occurs, the fault detection unit 213 is activated (S1002) to perform the below-described processing. The following describes three examples of an event that becomes a trigger for activation of the fault detection unit 213.

(1) An OS executed on a virtual computer recognizes an inconsistency or bug in itself, and issues a system fault occurrence event that is referred to as a panic.

(2) An instruction execution unit detects a hardware error that should be treated urgently.

(3) An OS hangs up.

In the case of (1), each OS executed on a virtual computer registers in advance a function at a hook for an OS panic, and the function is executed when the OS itself issues a panic event. Here, the hook means an interface with another module that requires a change of the instruction stream processed by an OS. Registration at the hook is performed by the following methods, for example. In cases where, being triggered by an event that an OS has called a panic function, the OS can perform processing (hereinafter, referred to as call-back) of making another function be executed, it is possible to register the function in question as the object of the call-back at the hook. Or, utilizing a fact that certain functions within an OS are called when an OS issues a panic event, instruction streams of those functions may be replaced.

In the case of (2), Machine Check Abort (MCA) occurs when the CPU 111 detects a hardware error that requires urgent treatment. When the virtual computer control unit 211 or the like recognizes (traps) occurrence of an MCA interrupt from the CPU 111, control is transferred to the fault detection unit 213.

In the case of (3), control is transferred to the fault detection unit 213 when the virtual computer control unit 211 recognizes a dump execution trigger interrupt that is issued for example when an OS hangs up. The dump execution trigger interrupt may include, for example, a Non-Maskable Interrupt (NMI) or an INIT interrupt.

First, the fault detection unit 213 pauses time-sharing allocation of the CPU 111 to the virtual computer on which the faulty OS has been running (S1003). Next, the fault detection unit 213 saves the register information of the virtual CPU, that was executing the faulty OS, in the CPU register table 142 corresponding to that virtual CPU (S1004). To that end, for example, the fault detection unit 213 first acquires the virtual computer that was executing the faulty OS. For example, to acquire the virtual computer that was executing the faulty OS, it is possible that the storage unit 113, or the like, stores in advance a table associating a virtual computer with an OS executed on that virtual computer, and the fault detection unit 213 refers to that table to acquire the virtual computer that was executing the faulty OS. Next, from the CPU register table 142, the fault detection unit 213 reads a virtual CPU 402 that is associated with a virtual computer 401 matching the virtual computer that was executing the faulty OS. The fault detection unit 213 reads the register information of that virtual CPU 402 from the registers of the CPU 111, and stores the read register information to the save register 403 corresponding to that virtual CPU 402.

In cases where a plurality of CPUs 111 exist, to judge which CPU is shown as a virtual CPU 402, it is possible, for example, that the memory 112 or the storage unit 113 stores in advance a CPU correspondence table that associates a virtual CPU 402 with an actual CPU to that CPU, and the fault detection unit 213 refers to that table to specify the CPU shown as the virtual CPU 402.

As an example, a detailed description will be given of an operation in cases where a fault occurs when "OSb" performs processing by the virtual CPU "CPUbb". In such cases, the virtual computer executing "OSb" is the virtual computer b 203. Accordingly, the fault detection unit 213 reads the register information for performing processing by the virtual CPU "CPUbb" from the registers of the CPU 111, and saves the read register information to the save register 403 associated with the virtual computer 401 "virtual computer b" and the virtual CPU 402 "CPUbb" in the CPU register table 142 exemplified in FIG. 4.

Next, the fault detection unit 213 performs exclusive control in order to prevent concurrent execution of the processing in and after the below-described step S1006 due to occurrence of fault in another OS running on a virtual computer other than the faulty OS (S1005).

Next, the fault detection unit 213 pauses time sharing allocation of the CPU 111 to all the virtual computers other than the virtual computer on which the fault has occurred, for example by instructing the virtual computer control unit 211 to perform processing for this (S1006). Next, the fault detection unit 213 saves the register information of the CPU 111, which was performing processing of the virtual computers other than the virtual computer on which the fault has occurred, to the CPU register table 142 (S1007). An example of this operation is similar to the above-described step S1004, and its description is omitted.

After the above-described processing by the fault detection unit 213, follows control by the below-described dump execution unit 214. An example of operation of the dump execution unit 214 will be described referring to FIG. 11.

Figure 11:
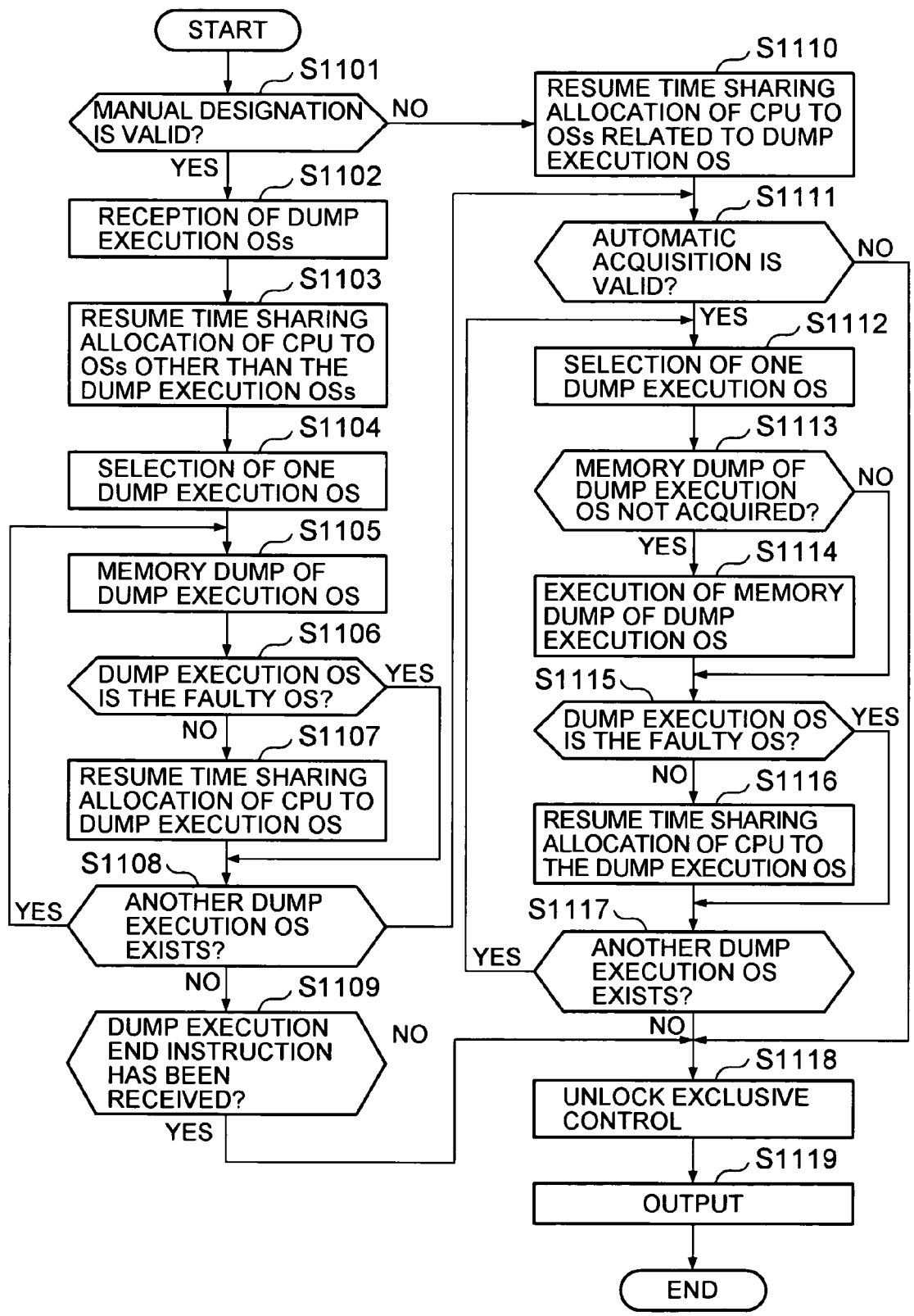
FIG. 11 is a flowchart showing an example of operation in performing memory dump in the same embodiment.

In FIG. 11, the dump execution unit 214 first judges whether the manual designation is valid or not in the dump execution policy table 157 (S1101). For example, to that end, the dump execution unit 214 refers to the dump execution policy table 157 and judges whether the validity flag 702 corresponding to the dump execution OS designation 701 "manual designation" is "Yes". In cases where the validity flag 702 in question is "Yes", the dump execution unit 214 judges that the manual designation in the dump execution policy table 157 is valid.

Figure 12:
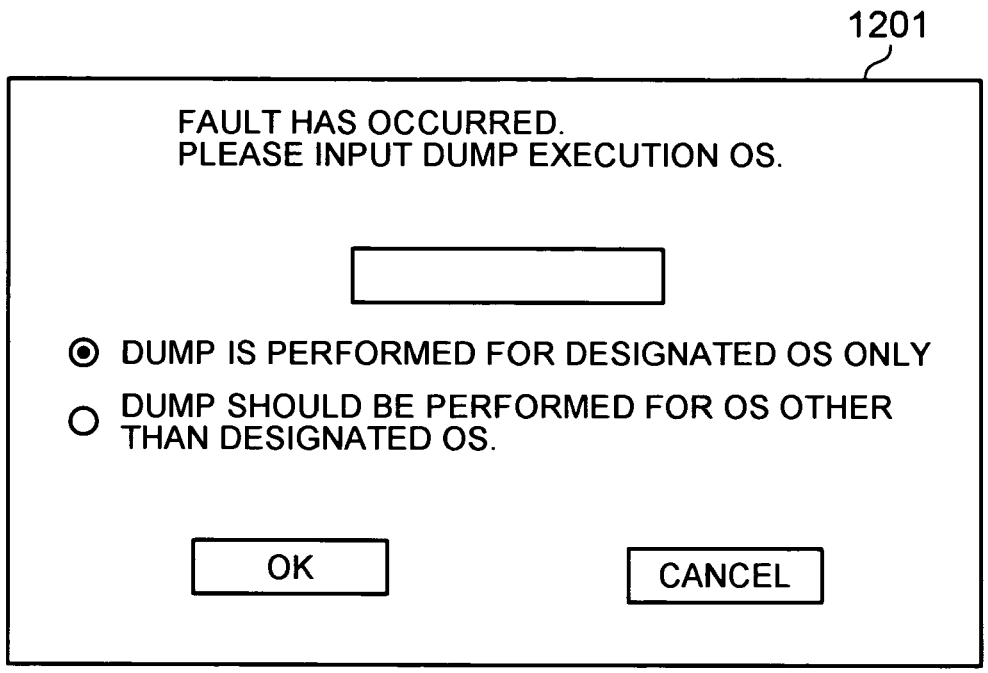
FIG. 12 is a view showing an example of screen in the same embodiment.

When the judgment in S1101 shows that the manual designation in the dump execution policy table 157 is valid, the dump execution unit 214 instructs the change unit 212 to receive a dump execution OS or OSs. The change unit 212 receives a dump execution OS or OSs that are inputted through the input unit 114 or the communication interface 116 (S1102). For example, to that end, the change unit 212 may output prescribed screen data read from the memory 112, the storage unit 113, or the like, so that a screen 1201 (an example of which is shown in FIG. 12) is displayed on the output unit 115, such as a display, or the display of the information processing apparatus 120. As the dump execution OS or OSs, the administrator, or the like, inputs designation of at least one of the OSs a, b, and c 223, 233, and 243 executed on the respective virtual computers a, b, and c 202, 203, and 204 running in the computer 100, for example by using the input unit 114, or the input unit of the information processing apparatus 120. The change unit 212 delivers the inputted OS or OSs as the dump execution OS or OSs to the dump execution unit 214. Here, in cases where an OS other than the OSs stored in the memory 112 or the storage unit 113 is inputted, the change unit 212 or the dump execution unit 214 may output information requesting another input, to the output unit 115 or the output unit of the information processing unit 120.

Next, the dump execution unit 214 resumes the time sharing allocation of the CPU 111 to virtual computers of OSs that are not the dump execution OS or OSs received in S1102 and not designated as the dump execution OSs for the faulty OS in the dump execution OS table 156, to resume the processing by those OSs (S1103). For example, to that end, the dump execution unit 214 selects one of the virtual computers realized on the computer 100, and judges whether the OS executed by this virtual computer matches at least one of the dump execution OS or OSs received in S1102. When this judgment indicates a match, then the dump execution unit 214 selects another among the virtual computers realized on the computer 100, and performs the same judgment. On the other hand, when this judgment does not indicate a match, then the dump execution unit 214 refers to the dump execution OS table 156, and judges in the matrix part 604 whether an element defined by a faulty OS 601 matching the faulty OS in question and a dump execution OS 602 matching the OS executed by the selected virtual computer is "No". When the judgment shows that the element in question of the matrix part 604 is "No", the dump execution unit 214 instructs the virtual computer control unit 211 to resume the time sharing allocation of the CPU 111 to the selected virtual computer. In accordance with the instruction, the virtual computer control unit 211 resumes the time sharing allocation of the CPU 111. This operation is same as one for a virtual computer of the conventional technology, and its description is omitted. Further, when the above judgment shows that the element in question of the matrix part 604 is "Yes", the dump execution unit 214 selects another among the virtual computers realized on the computer 100, and performs the same judgment. The dump execution unit 214 performs this processing for all the virtual computers realized on the computer 100.

As a result of the above processing, the OSs other than the dump execution OS or OSs resume normal processing in order to resume the service operations.

As an example, a detailed description will be given of an operation in the case where the faulty OS is "OSb", and "OSa" is received in S1102. The dump execution unit 214 first selects the virtual computer a 202. The OS executed by the virtual computer a 202 is "OSa", which matches the dump execution OS "OSa" received in S1102. Thus, the dump execution unit 214 selects the virtual computer b 203. The OS executed by the virtual computer b 203 is "OSb", which does not match the dump execution OS "OSa" received in S1102. In the matrix part 604 of the dump execution OS table 156 exemplified in FIG. 6, the element defined by the faulty OS 601 "OSb" and the dump execution OS 602 "OSb" is "Yes". As a result, the dump execution unit 214 does not give an instruction to resume the time sharing allocation of the CPU 111 to the selected virtual computer b 203. Next, the dump execution unit 214 selects the virtual computer c 204. The OS executed by the virtual computer c 204 is "OSc", which does not match the dump execution OS "OSa" received in S1102.

In the matrix part 604 of the dump execution OS table 156 exemplified in FIG. 6, the element defined by the faulty OS 601 "OSb" and the dump execution OS 602 "OSc" is "No". As a result, the dump execution unit 214 gives an instruction to resume the time sharing allocation of the CPU 111 to the selected virtual computer c 204.

The dump execution unit 214 selects one of the dump execution OSs received in S1102 (S1104).

Next, the dump execution unit 214 performs memory dump of the dump execution OS selected in S1104 (S1005). To that end, the dump execution unit 214 refers to the memory management table 141 for virtual page addresses 312 associated with a virtual computer 311 matching the virtual computer of the dump execution OS selected in S1104, and reads actual page addresses 313 corresponding to those virtual page addresses 312 in the order of increasing value of a virtual page address 312 (i.e. starting from the lowest address). Here, to acquire the virtual computer of the selected dump execution OS, for example, the dump execution unit 214 may refer to a table that associates a virtual computer with an OS executed on that virtual computer, as described above. Next, the dump execution unit 214 reads data in an area indicated by the read actual page address 313 from the memory 112, and stores the read data together with information indicating the dump execution OS selected in S1104 to a prescribed area of the storage unit 113. In the case where a plurality of actual page addresses 313 have been read, the dump execution unit 214 performs the above processing with respect to each of areas indicated by those actual page addresses 313. Here, the register information of the virtual computer corresponding to the dump execution OS selected in S1104 has been already saved in the above-described processing by the fault detection unit 213. The dump execution unit 214 reads a save register 403 associated with a virtual computer 401 matching the virtual computer of the dump execution OS selected in S1104, from the CPU register table 142. The register information in the register areas of the CPU 111, which is indicated by the read save register 403, is stored to the storage unit 113, being associated with the data stored in the storage unit 113 in the above processing.

As an example, a detailed description will be given of an operation in cases where the faulty OS is "OSb" and "OSb" is selected in S1104. The virtual computer executing "OSb" is the virtual computer b 203. As page addresses associated with the virtual computer 311 "virtual computer b", the dump execution unit 214 reads the virtual page address 312 "bbb" and its actual page address 313 "BBB" and the virtual page address 312 "bbbbbb" and its actual page address 313 "BBBBBB" from the memory management table 141 exemplified in FIG. 3B. Next, the dump execution unit 214 reads data in the area indicated by the actual page address 313 "BBB" from the memory 112, and stores the read data in association with information indicating "OSb" in a prescribed area of the storage unit 113. Further, the dump execution unit 214 reads data in the area indicated by the actual page address 313 "BBBBBB" from the memory 112, and stores the read data in association with the information indicating "OSb" in a prescribed area of the storage unit 113. Further, the dump execution unit 214 reads data stored in the save register 403 associated with the virtual computer 401 "virtual computer b" from the CPU register table 142 exemplified in FIG. 4, and stores the read data in the storage unit 113, in association with the information indicating "OSb" and the like.

Next, the dump execution unit 214 judges whether the dump execution OS selected in S1104 is the faulty OS or not (S1106).

When the result of the judgment in S1106 shows that the dump execution OS selected in S1104 is not the faulty OS, the dump execution unit 214 resumes the time sharing allocation of the CPU 111 to the dump execution OS selected in S1104, and resumes the processing by that OS (S1107). An example of operation to that end is similar to the above, and its description is omitted.

On the other hand, when the result of the judgment in S1106 shows that the dump execution OS selected in S1104 is the faulty OS, or after the processing in S1107, the dump execution unit 214 judges whether there is an unselected OS among the dump execution OSs received in S1102 (S1108).

When the result of the judgment in S1108 shows the existence of an unselected OS, the dump execution unit 214 performs the processing of S1105 again, and selects an unselected OS among the dump execution OSs received in S1102.

On the other hand, when the result of the judgment in S1108 shows non-existence of an unselected OS, the dump execution unit 214 judges whether an instruction to end the dump execution processing has been received or not (S1109). This instruction may be received together with the dump execution OS or OSs in S1102, for example, or may be inputted through the input unit 114 or the communication interface 116 at any time. In cases where the instruction is received together with the dump execution OS or OSs in S1102, it is possible to receive an instruction on whether a dump should be performed only with respect to the designated OS or with respect to OSs other than the designated OS also, through radio buttons as exemplified in the screen 1201 of FIG. 12 mentioned above. In that case, when "Dump should be performed with respect to only the designated OS" is selected, then the dump execution unit 214 judges that a dump execution processing end instruction has been received. On the other hand, when "Dump should be performed also with respect to OSs other than the designated OS" is selected, then the dump execution unit 214 judges that a dump execution processing end instruction has not been received. Further, the administrator or the like may give an instruction to end the dump execution processing through the input unit 114 or the input unit of the information processing apparatus 120 at any time after designating the dump execution OS. In accordance with the instruction, the computer 100 or the information processing apparatus 120 issues a predetermined command such as an interruption command. When the predetermined command has been issued, the dump execution unit 214 judges that a dump execution processing end instruction has been received.

When the judgment in S1109 shows that a dump execution processing end instruction has been received, the dump execution unit 214 performs the below-described processing of S1118.

When the judgment in S1101 shows that the manual designation in the dump execution policy table 157 is not valid, or when the judgment in S1109 shows that a dump execution processing end instruction has not been received, then the dump execution unit 214 resumes the time sharing allocation of the CPU 111 to the OSs other than the dump execution OS or OSs, and resumes the processing by those OSs (S1110). For example, to that end, the dump execution unit 214 first selects one virtual computer among the virtual computers realized on the computer 100. Next, the dump execution unit 214 refers to the dump execution OS table 156 and judges in the matrix part 604 whether the element defined by a faulty OS 601 matching the faulty OS and a dump execution OS 602 matching the OS executed by the selected virtual computer is "No". When the judgment shows that the above element of the matrix part 604 is "No", the dump execution unit 214 instructs the virtual computer control unit 211 to resume the time sharing allocation of the CPU 111 to the selected virtual computer. According to the instruction, the virtual computer control unit 211 resumes the time sharing allocation of the CPU 111 to the selected virtual computer. This operation is the same as an operation in the conventional virtual computer technology, and its description is omitted. On the other hand, if the above judgment shows that the element of the matrix part 604 is "Yes", the dump execution unit 214 selects another one among the virtual computers realized on the computer 100, and performs the same judgment. The dump execution unit 214 performs this processing for all the virtual computers realized on the computer 100.

As an example, a detailed description will be given of an operation in the case where the faulty OS is "OSb". The dump execution unit 214 first selects the virtual computer a 202. The OS executed by the virtual computer a 202 is "OSa". In the matrix part 604 of the dump execution OS table 156 exemplified in FIG. 6, the element defined by the faulty OS 601 "OSb" and the dump execution OS 602 "OSa" is "Yes". Accordingly, the dump execution unit 214 does not give an instruction to resume the time sharing allocation of the CPU 111 to the selected virtual computer a 202. Next, the dump execution unit 214 selects the virtual computer b 203. The OS executed by the virtual computer b 203 is "OSb". In the matrix part 604 of the dump execution OS table 156 exemplified in FIG. 6, the element defined by the faulty OS 601 "OSb" and the dump execution OS 602 "OSb" is "Yes". Accordingly, the dump execution unit 214 does not give an instruction to resume the time sharing allocation of the CPU 111 to the selected virtual computer b 203. Next, the dump execution unit 214 selects the virtual computer c 204. The OS executed by the virtual computer c 204 is "OSc". In the matrix part 604 of the dump execution OS table 156 exemplified in FIG. 6, the element defined by the faulty OS 601 "OSb" and the dump execution OS 602 "OSc" is "No". Accordingly, the dump execution unit 214 gives an instruction to resume the time sharing allocation of the CPU 111 to the selected virtual computer c 204.

Next, the dump execution unit 214 judges whether the automatic acquisition is valid or not in the dump execution policy table 157 (S1111). For example, to that end, the dump execution unit 214 refers to the dump execution policy table 157, and judges whether the validity flag 702 corresponding to the dump execution OS designation 701 "dump execution OS table" is "Yes" or not. If the validity flag 702 in question is "Yes", the dump execution unit 214 judges that the automatic acquisition in the dump execution policy table 157 is valid.

When the judgment in S1111 shows that the automatic acquisition in the dump execution policy table 157 is not valid, the dump execution unit 214 performs the below-described processing S1118.

On the other hand, when the judgment in S111 shows that the automatic acquisition in the dump execution policy table 157 is valid, the dump execution unit 214 selects one of the dump execution OS or OSs (S1112). For example, to that end, the dump execution unit 214 selects one of the OSs to which the time sharing allocation of the CPU 111 has not been resumed as a result of the processing S1110.

Next, the dump execution unit 214 judges whether a memory dump has been already performed with respect to the dump execution OS selected in S1112, as a result of the above manual designation (S1113). For example, to that end, the dump execution unit 214 refers to the prescribed area of the storage unit 113 to judge whether information indicating the OS matching the dump execution OS selected in S112 is stored.

When the judgment in S1113 shows that memory dump has not been performed yet with respect to the dump execution OS selected in S1112, as a result of the above manual designation, then the dump execution unit 214 performs memory dump with respect to the dump execution OS selected in S1112 (S1114). An example of the operation for this is same as the operation in the above S1105, and its description is omitted.

When the judgment in S1113 shows that memory dump has been already performed with respect to the dump execution OS selected in S1112 as a result of the above manual designation, or after the processing of S1114, the dump execution unit 214 judges whether the dump execution OS selected in S1112 is the faulty OS or not (S1115).

When the judgment in S1115 shows that the dump execution OS selected in S1112 is not the faulty OS, the dump execution unit 214 resumes the time sharing allocation of the CPU 111 to the dump execution OS selected in S1112, to resume the processing by that OS (S1116). An example of operation for this is same as one described above, and its description is omitted.

When the judgment in S115 shows that the dump execution OS selected in S1112 is the faulty OS, or after the processing of S1116, the dump execution unit 214 judges whether there is an unselected OS among the dump execution OS or OSs (S1117).

When the judgment in S1117 shows existence of an unselected OS, the dump execution unit 214 performs the processing of S1112 again to selects an unselected OS out of the dump execution OS or OSs.

Figure 13:
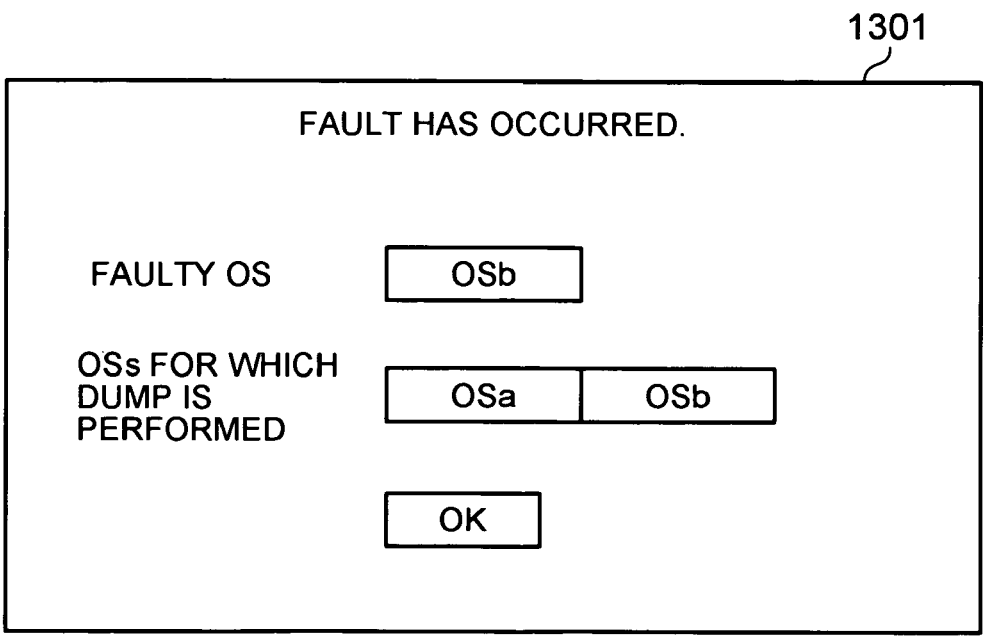
FIG. 13 is a view showing an example of screen in the same embodiment.

When the judgment in S117 shows non-existence of an unselected OS, the dump execution unit 214 releases the exclusive control that has been set above in S1005 (S1118). The dump execution unit 214 outputs a part or all of the faulty OS, the dump execution OS or OSs, the register information acquired in the above processing, the memory information, and the like to the output unit 115 or the communication interface 116 (S119). FIG. 13 shows an example of a screen 1301 that displays the faulty OS, the dump execution OSs, and the like on the display of the computer 100 or the information processing apparatus 120. In FIG. 13, the faulty OS and the dump execution OSs included in the screen 1301 are the faulty OS and the OSs for which memory dump has been performed in the above processing of S1105 and S1114. Further, the dump execution unit 214 may activate software (not shown) held by the computer 100 or the information processing apparatus 120 for determining the cause of occurrence of fault, to make the software perform processing for determining the cause based on the register information, the memory information acquired in the above processing. Such software is a conventional technology, and may be a debugger, for example.

After the processing by the dump execution unit 214 ends as described above, the virtual computer control unit 211 or the like makes the virtual computer that executes the faulty OS reactivate the faulty OS, for example by giving an instruction to that virtual computer. At that time, it is possible that the virtual computer clears the information on the faulty OS in the related OS table 155 and the dump execution OS table 156, and, after the reactivation, sets again information on the faulty OS in the related OS table 155 and the dump execution OS table 156.

As described above, when fault occurs in the course of processing an OS service, the computer 100 of the present embodiment can perform dump of memory including register information with respect a plurality of OSs at the same time, i.e., with respect to not only the faulty OS but also related OSs running in cooperation with the faulty OS. Further, it is not necessary that the memory dump is performed on a dedicated dump OS or a service operation OS, but the programs in the virtual computer monitor can perform memory dump processing. As a result, computer resources required for arranging a dedicated dump OS on a virtual computer can be deleted. Further, since overhead or critical dump processing is not performed on a service operation OS, memory dump can be performed without directly affecting performance and reliability of the service operation OS. Further, when fault occurs in a system that provides a service by cooperation of OSs, the cause can be specified and countermeasures can be taken perfectly and promptly.

Further, since manual designation of dump execution OSs is possible, fault can be easily dealt with even in cases of an OS the halting of which is not desired even when a fault occurs, for example, in the course of development or testing.

Second Embodiment

Next, a second embodiment will be described.

The first embodiment has been described above taking an example where the dump execution system of the embodiment is applied to a virtual computer system. As the second embodiment, an example is taken where the dump execution system of the above embodiment is applied to the conventional LPAR technology.

To realize LPAR, a hypervisor, a hypervisor memory area, LPAR memory areas, and the like, are required. Here, the hypervisor is firmware for realizing a logical partitioning function of a computer system, as described above. The hypervisor memory area is a memory area used by the hypervisor. The LPAR memory areas are memory areas used by respective LPARs.

The dump execution system of the above embodiment can be applied to the conventional LPAR technology by using the same configuration and operation as in the first embodiment, taking the above virtual computers 202 to 204 as a plurality of LPARs, the above VMM 201 as the LPAR hypervisor, the above memory area 304 as the hypervisor memory area, and the above memory areas 301-303 as the LPAR memory areas, for example.

The second embodiment is different from the first embodiment in this point only, with the other features being same as in the first embodiment, and thus details of the second embodiment are not described.

Using the second embodiment also, it is possible to reduce costs and resources for arranging a dedicated dump OS on LPAR. A memory dump can be performed without directly affecting performance and reliability of a service operation OS.

Above, the embodiments of the invention have been described in detail referring to the drawings. However, a specific configuration of the invention is not limited to these embodiments. Many design variations can be realized without departing from the scope of the invention.

For example, the dump execution system of the present invention is not limited to application to the first embodiment and the second embodiment described above, and can be applied also to cases where one information processing apparatus performs processing of a plurality of OSs by time-sharing a CPU.

Further, in the above embodiment, the related OS table stores in advance OSs that operate in cooperation, and operating systems with which memory dump is performed are stored in advance in the dump execution OS table. However, the present invention is not limited to this. For example, it is possible that the related OS table is referred to when a fault occurs, and memory dump is performed with respect to the operating systems that operate in cooperation with the operation system in which the fault has occurred.

The invention claimed is:

1. A memory dump method by a computer system that performs respective processes of a plurality of operating systems in parallel, the computer system including: a dump execution OS storage means, which stores, among the plurality of operating systems, at least two of the operating systems, that operate in cooperation, associating the operating systems with each other; a first storage means, which stores data used for performing the respective processes of the plurality of operating systems; and a second storage means; and the memory dump method performed by the computer system comprising:

a detection step, in which a fault occurring in an operating system is detected;

a halting step, in which when the fault is detected, an operating system associated with the operating system in which the fault has occurred, being a faulty OS, is read from the dump execution OS storage means, and process execution of the faulty OS and process execution of the read operating system, being a dump execution OS, are halted;

a data acquisition step, in which data for performing the process of the faulty OS, and data for performing the process of the dump execution OS are read from the first storage means, and the read data are stored in the second storage means; and an outputting step, in which the data read from the second storage means are outputted.

2. A memory dump method according to claim 1, the computer system further including: a dump execution policy storage means, which stores information that indicates whether the data for performing a process of the operating system read from the dump execution OS storage means should be read or not; and an input means; and the memory dump method comprising:

in the halt step, when information read from the dump execution policy storage means indicates that the data for performing the process of the operating system read from the dump execution OS storage means is not read from the first storage means, with an operating system inputted through the input means as a dump execution OS, process execution of the faulty OS and process execution of the dump execution OSs are halted; and in the data acquisition step, the data for performing the process of the faulty OS, and the data for performing the halted process of the dump execution OS are read from the first storage means, and the read data are stored in the second storage means.

3. A memory dump method according to claim 2, wherein the memory dump method further comprises:

a resuming step, in which, after storing the data read from the first storage means in the second storage means, in the halting step, the process of the dump execution OS is resumed.

4. A memory dump method according to claim 1, wherein the memory dump method further comprises:

a resuming step, in which, after storing the data read from the first storage means in the second storage means, in the halting step, the process of the dump execution OS is resumed.

5. A storage medium storing a memory dump program that makes a computer system perform respective processes of a plurality of operating systems in parallel, the computer system including: a dump execution OS storage means, which stores, among the plurality of operating systems, at least two of the operating systems, that operate in cooperation, associating the operating systems with each other; a first storage means, which stores data used for performing the respective processes of the plurality of operating systems; and a second storage means; and the memory dump program making the computer system perform:
a detection step, in which a fault occurring in an operating system is detected;
a halting step, in which when the fault is detected, an operating system associated with the operating system in which the fault has occurred, being a fault OS, is read from the dump execution OS storage means, and process execution of the faulty OS and process execution of the read operating systems, being a dump execution OS, are halted;
a data acquisition step, in which data for performing the process of the faulty OS and data for performing the process of the dump execution OS are read from the first storage means, and the read data are stored in the second storage means; and
an outputting step, in which the data read from the second storage means are outputted.

6. A computer system that performs respective processes of a plurality of operating systems in parallel, comprising:
an instruction execution unit;
a memory;
a dump execution OS storage means, which stores, among the plurality of operating systems, at least two of the operating systems, that operate in cooperation, associating the operating systems with each other;
a storage means;
a detection means, which detects a fault occurring in an operating system;
a halting means, which, when the fault is detected, reads an operating system associated with the operating system in which the fault has occurred, being a faulty OS, from the dump execution OS storage means, and halts process execution of the faulty OS and process execution of the read operating system, being a dump execution OS;
a data acquisition means, which reads data for performing the process of the faulty OS, and data for performing the process of the dump execution OS from at least one of the instruction execution unit and the memory, and stores the read data in the storage unit; and
an outputting means, which outputs the data read from the storage means.

* * * * *